June 28, 1960  J. R. SLOAN  2,942,350
GAUGE FOR DETERMINING RADIAL PLAY IN ANTIFRICTION BEARINGS
Filed Dec. 19, 1956  3 Sheets-Sheet 1
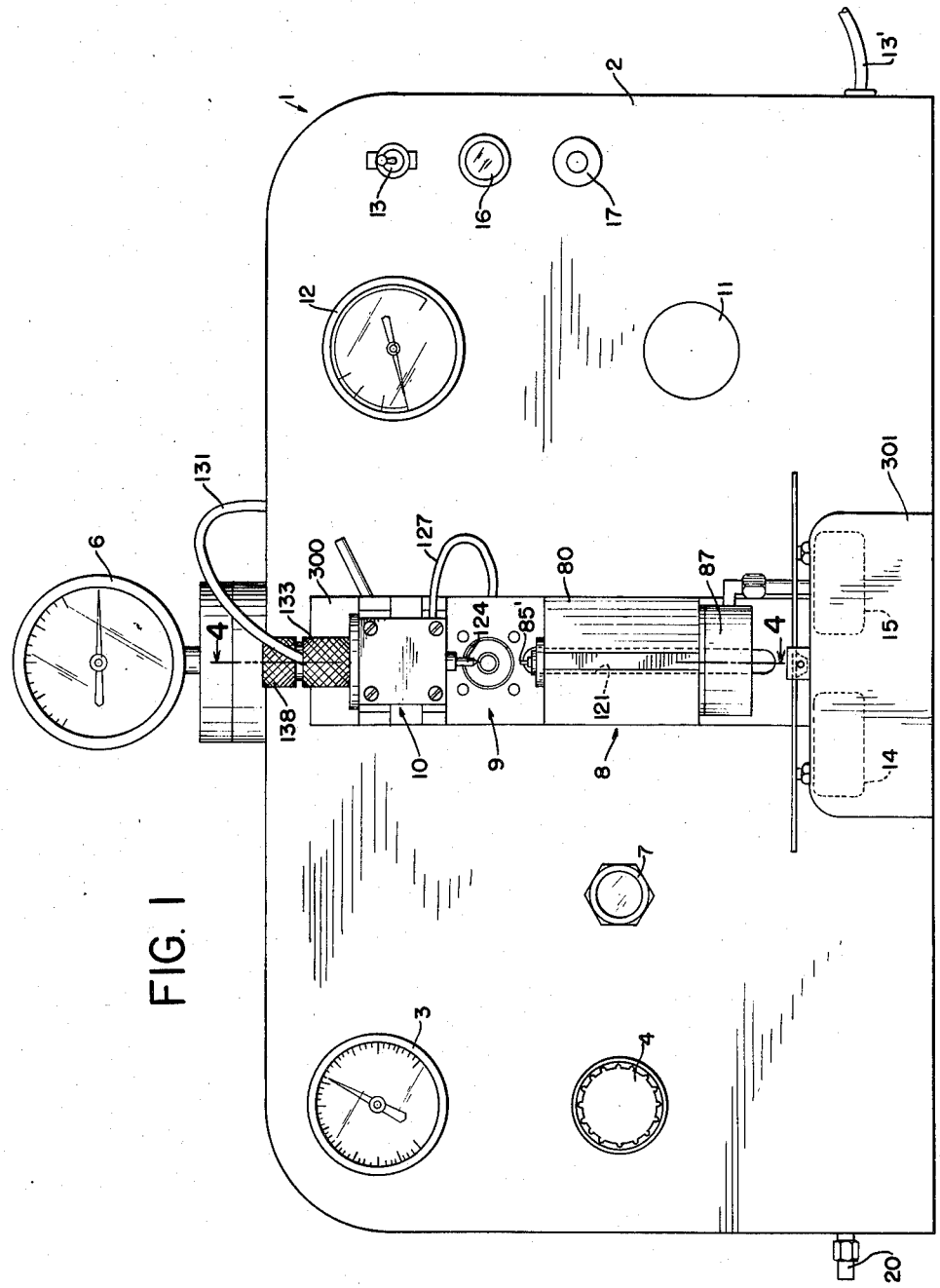
FIG. I
INVENTOR
J. RICHARD SLOAN
BY Pennie, Edmonds,
Morton, Barrows & Taylor
ATTORNEYS

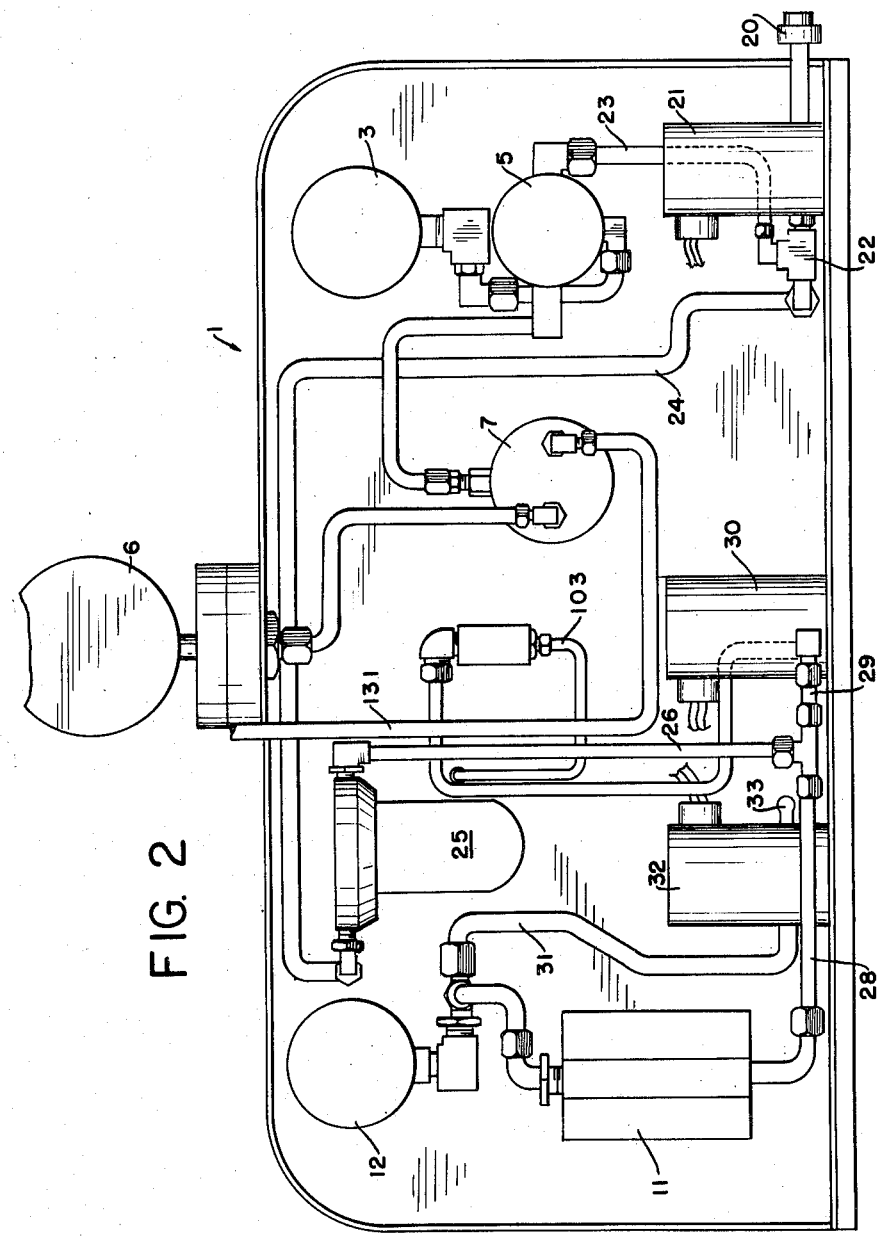

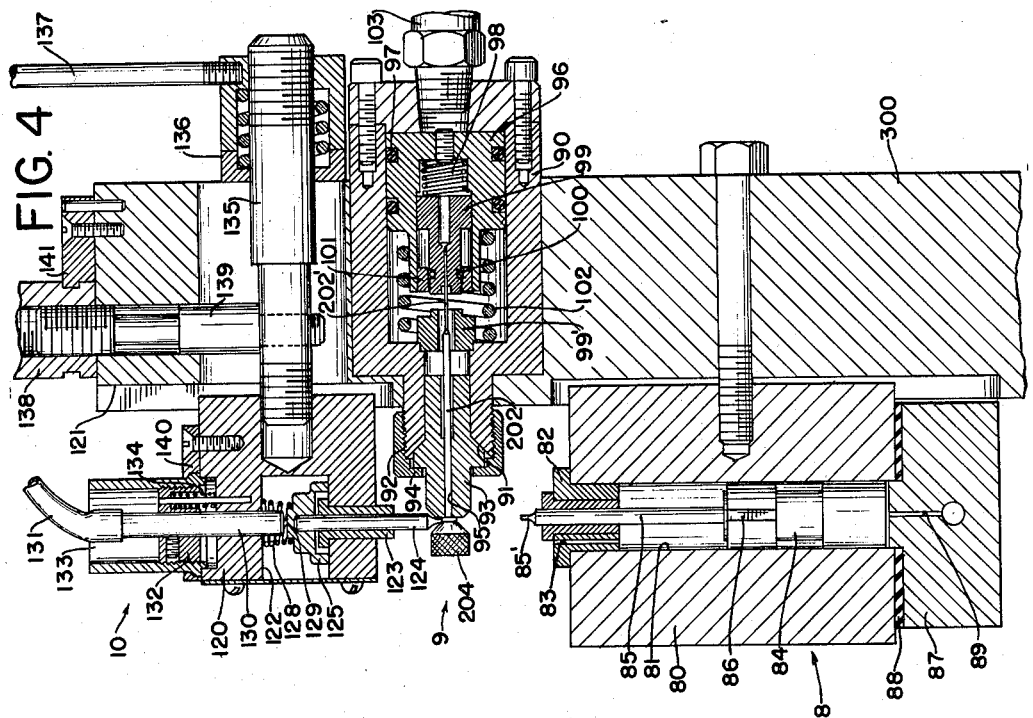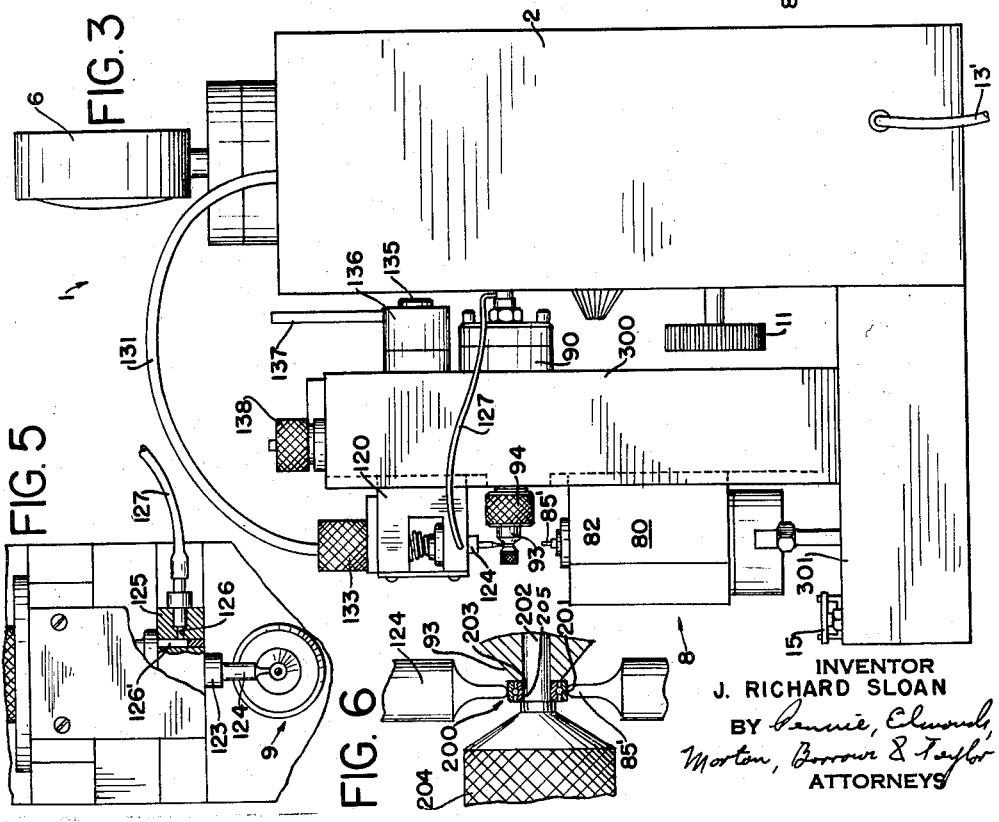

United States Patent Office 2,942,350
Patented June 28, 1960

2,942,350

GAUGE FOR DETERMINING RADIAL PLAY IN ANTIFRICTION BEARINGS

John Richard Sloan, Keene, N.H., assignor to Miniature Precision Bearings, Inc., Keene, N.H., a corporation of New Hampshire Filed Dec. 19, 1956, Ser. No. 629,317

1 Claim. (Cl. 33—174)

This invention relates generally to a gauge for measuring tolerances of antifriction bearings and, more particularly, to a gauge for measuring radial play of antifriction bearings having inner and outer races separated by antifriction elements.

It is important in the manufacture of antifriction bearings that precise tolerances be maintained if the bearings are to be effective to accomplish the purposes for which they are designed. It is particularly important in the design of antifriction bearings having inner and outer races that the radial play, or the amount of movement between the inner and outer races, be accurately determined and that this play be kept within prescribed tolerances. In some antifriction bearings, it is desirable to have a greater amount of radial play than in others in order to compensate for such contingencies as change of temperature and amount of radial load. Heretofore, it has been difficult and time-consuming to make accurate measurements to determine radial play, and this has been particularly so when the bearings to be measured were of the miniature type which are coming into increased usage throughout industry. Antifriction bearings of the miniature type are often as small as 1/10 of an inch in diameter at their outer race, consequently they are difficult to handle and insert in a testing device. It is therefore an object of this invention to provide for a device which will quickly and accurately measure radial play in antifriction bearings and especially in bearings of miniature size.

Broadly, I propose to mount the bearing on an arbor by having the arbor extend through the inner race of the bearing. The arbor is then inserted in a testing device and locked into place by means of a collet which grips one end of the arbor. An indicator pin is then brought into contact with an outer periphery of the outer race of the bearing. Next, a predetermined force is applied to the outer periphery of the outer race on the opposite side of the race from that with which the indicator pin is in contact. This will cause movement of the outer race relative to the inner race, which movement may be measured by resulting movement of the indicator pin. Pneumatic means are provided to move the collet into an unlocked position and also to move the indicator pin out of contact with the outer race of the bearing. Pneumatic means are also used to apply the predetermined force to the outer race. The pneumatic means are in turn controlled by solenoid valves operated by microswitches carried on the device.

The solenoid valves are so arranged that the indicator pin is brought out of contact with the outer race when the collet is unlocked. This allows the arbor with the attached bearing to be taken out of the device without contacting the sensitive indicator and so reduces the possibility of damage to the indicator pin.

Referring to the drawings in which a preferred embodiment of my invention is shown:

Fig. 1 is a front view of the device;

Fig. 2 is a rear view of the device with a protective cover removed;

Fig. 3 is a side view of the device shown in Fig. 1;

Fig. 4 is a sectional view of Fig. 1 taken along line 4—4 of Fig. 1;

Fig. 5 is an enlarged broken view of a part of Fig. 1;

Fig. 6 is an enlarged partial sectional view of a part of Fig. 3.

Referring to the drawings in more detail and Fig. 1 in particular, 1 denotes generally a measuring device constructed according to my invention wherein 2 is a panel having mounted thereon the indicating dials and switches for operating the device. 3 denotes an air pressure gauge for determining the amount of air pressure applied to a measuring system for measuring relative movement of the inner and outer races of the bearing to be checked to each other. 4 is an adjusting knob of a pressure regulator 5 (appearing in Fig. 2) for regulating pressure to the measuring system mentioned above.

Mounted immediately on top of the panel 2 is a measuring gauge 6 which, as will be explained hereafter, measures the distance the outer race moves relative to the inner race upon application of a predetermined load. This gauge is pneumatically operated and the scale may be adapted to read in any convenient form of measurement. A compensator valve 7 is used to adjust the linearity of the gauge 6.

A load cell indicated generally by 8 comprises the mechanism for exerting the predetermined load to the outer race of the bearing to be checked. A chuck indicated generally by 9, is adapted to hold an abor on which the bearing to be measured is mounted. Immediately above chuck 9 is an indicator means 10 to which measuring gauge 6 is connected.

To the right of the load cell 8 is a pressure regulator 11 which is used to set the predetermined force applied to the outer race of the bearing to be checked and which force is read on gauge 12. Gauge 12, as gauge 6, may also be adapted to read in any convenient scale, such as in ounces.

An electrical switch 13 connects the solenoid valves (hereafter explained) to a source of current 13' by which the solenoid valves may be operated by depressible microswitches 14 and 15. A light 16 indicates whether the electrical circuit has been closed by switch 13. A fuze box 17 is provided as a safety feature to prevent an excess of current from flowing through the system.

Fig. 2 shows more clearly the circuitry of the pneumatic lines running to the several gauges and compensating knobs. The measuring device 1 is connected at 20 to a source of pneumatic pressure, for example, compressed air. The air passes from the source 20 through a solenoid valve 21 which in turn is operated by the "off-on" switch 13. The air then passes through a joint 22 and then on through conduits 23 and 24. Conduit 23 leads to pressure regulator 5 and from there on to compensator 7. The gauge 3 is shown connected to pressure regulator 5 in order that it may indicate pressure exerted on the compensator 7.

Conduit 24 leads to a lubricator 25 in which air flowing into the system may be lubricated in order to reduce friction in the penumatic cylinders. From lubricator 25 the air passes through conduit 26 to a joint 27 from where it then passes through conduit 28 to pressure regulator 11 and conduit 29 to a solenoid valve 30.

Solenoid valve 30 is actuated by microswitch 14 and controls passage of the compressed air to the chuck 9 as will be more fully explained hereafter.

Compressed air passing through conduit 28 goes through pressure regulator 11 and thence through conduit 31 to solenoid valve 32 which is actuated by microswitch 15 to apply the predetermined force on the outer periphery of the outer race of the bearing to be checked.

The gauge 12 is connected to the conduit 31 and measures the force exerted on the outer bearing by the load cell 8. The air passes out of solenoid operated valve 32 through conduit 33 to the load cell 8.

Reference is now made to Fig. 4 which illustrates the detailed construction of load cell 8, pneumatic chuck 9 and the indicator means 10. Load cell 8 comprises a block 80 through which there is honed a hole 81. Pressed into the end of the hole is a bushing 82 having therein an exhaust passage 83. A dumb-bell shaped piston 84 is mounted for sliding movement in the hole 81 and is joined with a piston rod 85 which is free to slide through bushing 82. A small passage 86 is formed in the upper part of piston 84 by grinding flat an outer portion of the piston in order to vent the area between the extremities of the piston. A cap 87 is mounted on the bottom of the block 80 and makes an air-tight connection with the block by means of a gasket 88. Passageway 89 is drilled in the cap and connects with conduit 33, shown in Fig. 2. It is thus seen that when microswitch 15 is depressed, it will in turn actuate the solenoid valve 32 to allow passage of compressed air into the passageway 89 and thus exert a force on piston 84. This force will then be exerted on the outer race of the bearing by means of pin 85' which is mounted on the piston by means of rod 85.

The engagement of pin 85' with the bearing is clearly shown in Fig. 6 where 200 denotes generally a bearing being checked and 201 the outer race of the bearing. Bearing 200 is mounted on an arbor 202 which has the same diameter as the bore of the inner race 203 of the bearing. One end of the arbor has a reduced diameter 202' on which a collet engages, as explained later. Arbor 202 has a knurled knob 204 on its end in order to facilitate handling thereof. Inner race 203 of the bearing is held firmly in engagement with the end of the chuck nose 93 by means of shoulder 205 on the arbor 202 which bears on the end face of the inner race. The outer race 201 then may be moved freely relative to the inner race upon the application of force.

It is seen by referring to Fig. 4 that the construction of the pneumatic chuck 9 consists of a chuck cylinder 90 having at one end a ground internal tapered nose 91 and a threaded outer diameter 92. A chuck nose 93 which also has a tapered portion which cooperates with the tapered portion of the chuck cylinder 91, is held in place on the chuck cylinder by means of a chuck collar 94 which screws on the threaded portion 92 on the chuck cylinder 90. The chuck nose has a through hole 95 of the same size as the bore of the bearing to be checked in order to allow the entry of the holding arbor 202.

Inside the chuck cylinder 90 is a chuck piston 96 having thereon O rings 97 which make an air-tight fit of the piston with the cylinder. Inside of the piston 96 is a spring 98 which is so mounted as to urge a three jaw collet 99 outwardly of the piston. This collet is operated by 3 steel balls 100 spaced 120° apart which travel on a tapered cone 101 also mounted in the chuck piston. It is seen that when the collet 99 moves to the left with respect to tapered cone 101, that the jaws of the collet will be forced inwardly to tightly grip the arbor stem 202'. A spring 102 is inserted between the chuck piston and chuck cylinder to urge the chuck piston outwardly against the force of compressed air exerted on the chuck piston through means of conduit 103 which connects with solenoid operated valve 30.

It is seen that when microswitch 14 is depressed, it will actuate solenoid valve 30 to allow air to be exerted on chuck piston 96 through conduit 103. As chuck piston 96 moves to the left, as shown in Fig. 4, the end of the collet 99 will engage operating button 99'. Further movement of the piston to the left will cause the collet 99 to retract into the chuck piston thus allowing the balls 100 to expand to move radially outwardly and open the collet. The arbor with the mounted bearing may then be removed and a new one inserted. The spring 102 provides positive return of the piston 96 when pneumatic pressure is not exerted on the piston through conduit 103.

The indicator means 10 comprises a housing 120 having thereon a male key for engagement with a keyway 121 carried in the body of a column 300 which in turn is mounted on a base 301 of the gauging device. A horizontal machine slot 122 is cut in the housing member 120 to form upper and lower sections. A bushing 123 is carried in the lower section of the housing member formed by the slot and through which an indicator pin 124 is free to slide and which may, as shown in Fig. 6, engage the upper part of the outer periphery of the outer race of the bearing to be checked. Both indicator pin 124 and piston pin 85' are positioned so as to engage the outer race substantially along the center line of the bearing and of the ball train to minimize any error due to taper in the outer periphery of the outer race and also to minimize chance of tilt of the outer race due to uneven loading by the pins 124 and 85'. An indicator collar 125 in the shape of a mushroom is attached at one end to indicator pin 124 and it is made to overlap the head of the bushing 123. As shown in Fig. 5, a horizontal passageway 126 is drilled in collar 125 to intersect with a vertical passageway 126'. Vertical passageway 126' opens into the area between the bushing and collar 125. By applying air through means of conduit 127 which connects with conduit 103, the indicator pin 124 is lifted when the microswitch 14 is actuated and the chuck is opened. This prevents contact of the outer periphery of the outer race of the bearing to be checked and the point of the indicator pin 124.

A coil spring 128 is placed directly over the indicator collar 125 to apply a predetermined downward force on the indicator pin. In the top section of the housing 120, there is mounted a measuring member which measures movement of the indicator pin 124. The measuring member is a type known generally in the industry as a "Ballmatic" capsule type gaging element which is manufactured by the Moore Products Co. It comprises generally a ball 129 held loosely in the end of tube 130 so that when the ball is depressed in the tube, the clearance between the ball and a V seat (not shown) contained in the tube will be decreased. Tube 130 in turn is connected to conduit 131 which joins the compensator 7. Thus depressing the ball 129 into the V seat will cause a change in back pressure exerted on gauge 6 which will vary directly as to the movement of ball 129 and the outer race 201.

The tube 130 is held in a threaded adjusting sleeve 132 which in turn engages the internal thread of a fine adjusting knob 133. This adjusting sleeve contains 3 coil springs 134 (only one of which is shown) which are to prevent backlash of the fine adjusting knob. The entire housing 120 is held securely to column 300 by means of a male key carried on the housing which engages in the slot 121 in the column. A stud 135 is threaded at one end to the housing and at the other end to a locknut 136 which has a handle 137 at one end. This stud and locknut serve to hold the housing securely to the column. Stud 135 is adjusted vertically by means of coarse adjustment nut 138 which screws on at one end to stud 139. The other end of stud 139 is screwed into stud 135. In order to make a rough vertical adjustment of the position of housing 120 with respect to a part to be measured for radial play, the nut 136 is turned to loosen engagement of housing 120 with the column 300. Rough adjustment is then made by turning nut 138 until the housing is at the desired vertical position. The housing is then locked to the column by turning down locknut 136. Fine adjustment of the indicator pin is accomplished by turning adjustment nut 133 in the desired direction. Both nuts 133 and 138 have clamp means 140 and 141, respectively, whereby the adjustment nuts may be locked into place.

The microswitches 14 and 15 are of a teeter board construction so that they both cannot be depressed at the same time. This provides a safety feature in that the predetermined force on the pin 85 may not be exerted while at the same time the chuck is in the unlocked position. Such interlocking of the microswitches prevents any possible inadvertent damage that may result upon application of a predetermined load if there is no bearing in place to be measured.

The procedure for measuring the radial play of bearings is as follows:

The housing 120 is adjusted vertically to the desired height for checking a particular size bearing. The indicator gauge 6 is then calibrated by first inserting a master in the chuck corresponding to the maximum dimension to be measured. Compensator valve 7 is then adjusted so that gauge 6 will read its desired maximum value, while indicator pin 124 is in contact with the master. Next a minimum master is inserted in the chuck and the gauge 6 adjusted to read its desired minimum value by adjusting compensator valve 7. If the spread between the maximum and minimum values on the gauge is too great or too little, adjustments may be made by adjusting knob 4 which regulates pressure to the system. This procedure is then repeated and finer adjustments made, until the gauge spread agrees to these masters. A mean master is then inserted in the chuck in order to check the zero reading of the gauge.

After the gauge 6 has been adjusted to give a zero reading for a mean master a production bearing 200 is mounted on the arbor 202. The microswitch 14 is then depressed allowing insertion of the arbor into the chuck. The microswitch 14 is then let up which will allow the piston 96 to move to the right as shown in Fig. 4, under the influence of spring 102 and thus lock the arbor 202 and bearing 200 securely into place. At the same time the switch 14 is depressed, compressed air is forced into the chamber between the collar 125 and bushing 123, lifting the indicator pin 124 out of possible contact with the outer race of the bearing when the arbor 202 on which it was mounted is inserted. Radial load regulator 11 is then adjusted to give the desired radial load which is to be exerted on the outer race by the pin 85' and the gauge 6 is again zeroed by the fine adjustment knob 133. After this has been done, the microswitch 15 is actuated causing compressed air to be exerted on piston 84 which in turn will exert the desired pressure upon the outer race of the bearing will then be indicated on gauge 6. It may be desirable to check the radial play at different positions of the bearing. This may be done by turning the bearing, reinserting again in the chuck, and adjusting the gauge to zero by use of the fine adjustment knob 133.

It has been found that a gauging device constructed according to my invention has appreciably decreased the time necessary in which to make accurate measurements of radial play in anti-friction bearing assemblies, while at the same time facilitating the handling of miniature bearing assemblies. Another advantage is that a number of arbors can be provided so that the testing operator has only to pick up an arbor on which a bearing is already mounted and by following the steps as outlined above, can quickly determine whether the bearing meets the precision standards of production as required.

Various modifications may be made in the method and apparatus herein disclosed without departing from the sphere of the invention.

I claim:

A testing device for measuring radial play in an assembled antifriction bearing having an inner race and an outer race, comprising a detachable arbor engaging said bearing through said inner race, a shoulder on said arbor for engaging the end face of said inner race, a collet releasably engaging one end of said arbor to hold it in a fixed position, a chuck piston having said collet slidably mounted therein, a chuck cylinder having said chuck piston slidable therein, spring means biasing said chuck piston and said collet away from said arbor, pneumatic means for moving said chuck piston against the force of said spring, said collet releasing said arbor when said piston reaches the limit of its travel against the force of said spring, force means for applying a predetermined force to a portion of the outer periphery of said outer race, indicator pin means adapted to engage a portion of the outer periphery of said outer race substantially opposite to that engaged by said force means, measuring means for measuring the resultant movement of said outer race upon the application of said predetermined force and retraction means for automatically retracting said indicator pin means from engagement with said outer race upon the application of pneumatic pressure to move said chuck piston to disengage said arbor.

References Cited in the file of this patent

UNITED STATES PATENTS

| 2,356,236 | Gagne | Aug. 22, 1944 |
| 2,419,280 | Neff | Apr. 22, 1947 |
| 2,525,068 | Ericson | Oct. 10, 1950 |
| 2,636,379 | Van Dorn | Apr. 28, 1953 |
| 2,647,456 | Aller | Aug. 4, 1953 |
| 2,659,157 | Aller | Nov. 17, 1953 |
| 2,697,879 | Tandler | Dec. 28, 1954 |
| 2,785,799 | Esken | Mar. 19, 1957 |
| 2,811,781 | Johnson | Nov. 5, 1957 |